J. A. KRAKE.
Grain Separator.
No. 1,786. Reissued Oct. 4, 1864.
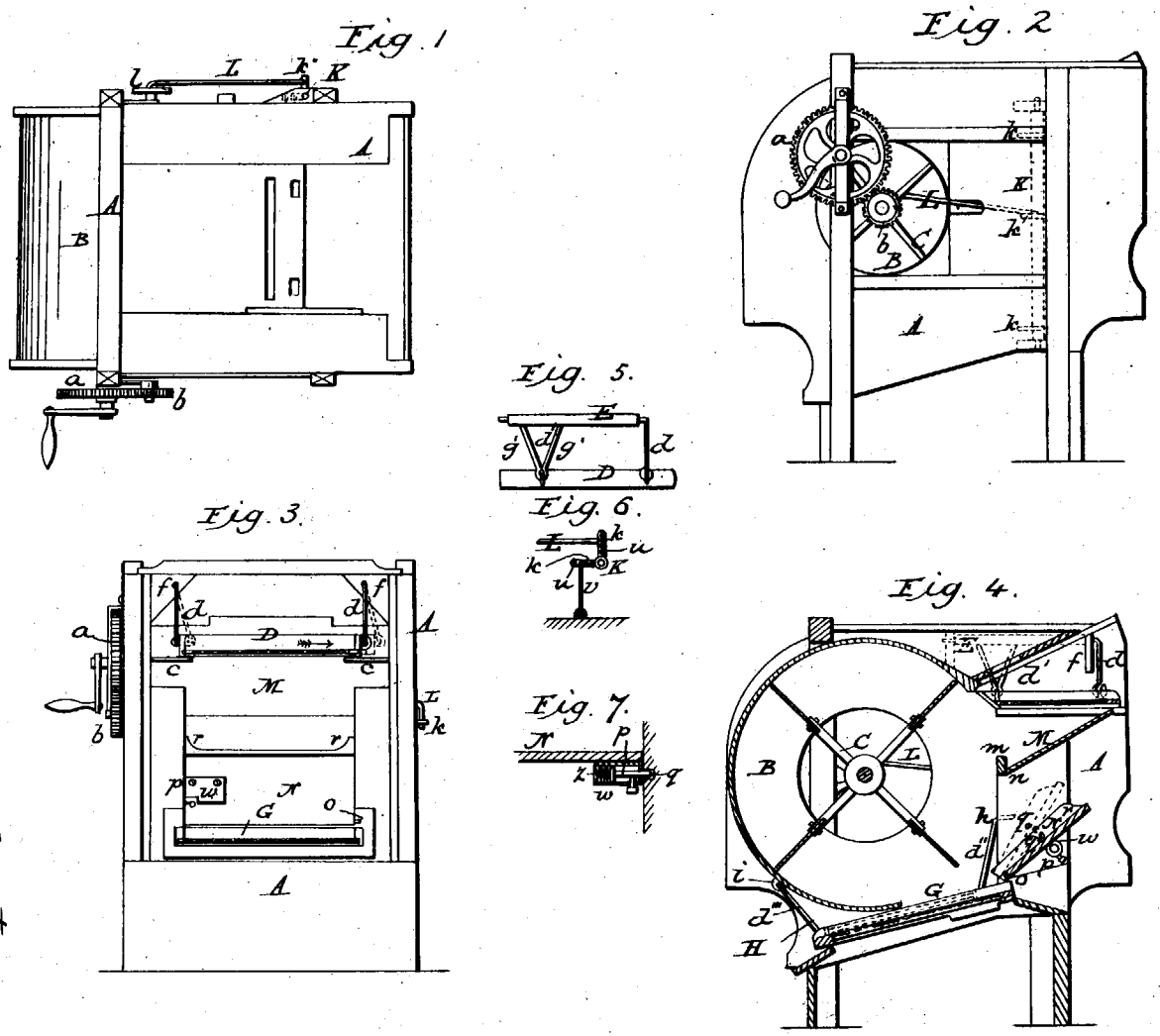
Attest
Chas. Spencer
R. T. Osgood
Inventor.
John A. Krake
by J. Fraser his Atty.
N. PETERS, Photo-Lithographer, Washington, D. C.

UNITED STATES PATENT OFFICE.

JOHN A. KRAKE, OF ALDEN, NEW YORK.

IMPROVEMENT IN GRAIN-SEPARATORS.

Specification forming part of Letters Patent No. 13,849, dated November 27, 1855; Reissue No. 1,786, dated October 4, 1864.

*To all whom it may concern:*

Be it known that I, JOHN A. KRAKE, of Alden, in the county of Erie and State of New York, did invent a certain new and useful Improvement in Fanning-Mills, for which Letters Patent of the United States were granted me on the 27th day of November, 1855; and I do hereby declare that the following is a full and exact description thereof, reference being had to the accompanying drawings, making part of this specification.

Figure 1 is a plan of a fanning-mill provided with my improvement; Fig. 2, a side elevation thereof; Fig. 3, an end elevation of the same; Fig. 4, a central longitudinal vertical section; Figs. 5, 6, and 7, views of parts detached.

Like letters of reference indicate corresponding parts in all the figures.

My invention consists in suspending or supporting the screens or the shoe that sustains them, in such a manner that said screens receive a lateral vibratory motion, and they retain the same horizontal or level position at all points of the vibration, and also in the arrangement of parts hereinafter described.

As represented in the drawings, A is the usual frame and casing of the fanning mill; B, the fan chamber, and C the fan, driven by means of a cog-wheel, *a*, gearing into a pinion, *b*, on its shaft.

In the old-fashioned mill the shoe is either pivoted at one end, while the other is shaken laterally, or else it receives only a longitudinal vibration. In the first case the motion is objectionable, because there is but very little action at the end where the mass first falls on the screens, and which, if anything, should receive the most, while in the latter case the action is irregular, the grain and chaff being thrown violently over the discharge end of the screens at the commencement of the inward vibration, while it is not thrown over at all in the outward.

It is my object to give the shoe D only a lateral motion, but to actuate both ends alike. To accomplish this, the shoe itself is usually made somewhat narrower than the mill, or else the sides of the mill are cut away to allow the shoe to vibrate through, and the spaces at the sides are covered by ledges or shelves *c c*, or equivalent, beneath the shoe, so as to confine the blast, but allow said shoe to work freely, as represented in Figs. 3 and 4.

In order to sustain the shoe and give it the proper motion I prefer to hold it by means of two pendent arms or rods, *d d'*, on each side and at each end respectively, the same forming a part of or being connected with a small rock-shaft, E, hung longitudinally above each side of the shoe in bearings *f f*, Figs. 3 and 4. As represented in the drawings, the arm *d* is single, and is a continuation of the rock-shaft, being bent down and jointed to the shoe at the side by means of an eye and staple. The arm *d* at the opposite end is similarly jointed to the shoe by an eye and staple, but it is made double-shanked, the two sides *g g'* diverging as they extend upwards, thus forming longitudinal braces, and being secured in any convenient manner to the rock-shaft. The effect of this arrangement, it will be seen, is to allow a free lateral swinging movement, but to prevent any such longitudinal movement the arm *d'* serving as a brace in this respect.

It is obvious that there may be various modifications of the device above described without departing from the principle of the invention. Such, for instance, is shown beneath the fan-case in Fig. 4, where a screen, G, acting as a discharge-board, is represented, suspended by a small iron rod, H, on each side, passing through eyes secured to the screen or its shoe, its ends *d'' d'''* being bent upward angularly, the former having a journal, *h*, resting in a suitable bearing, and the latter having an eye engaging with a staple secured to the back of the fan-case, as shown at *i*. This device allows a free lateral movement, while it is braced against a longitudinal one. Another modification is the use of rods having a wide hinge at the top, so as to turn only in one direction. Another still, the use of flat springs, secured by two or more nails or screws at the top and having a free lateral motion at the bottom. It is also apparent that the screens, instead of being suspended by the arms *d d'*, may be supported on top of them with the same effect, the position only being reversed.

The advantage of this arrangement is manifest. The whole shoe receives an equal and uniform motion, which, being a lateral one, only agitates the mass evenly, distributes it equally over the surface, and carries the chaff over the discharge end of the screens in a thin regular sheet, so as to receive the best action of the blast. Its advantage in this respect over a shoe pivoted at one end and having a lateral motion, or over one having only a longitudinal motion, or one having an irregular motion combining both, will at once be seen. Where the shoe is pivoted at one end the mass is not distributed equally, nor does it flow regularly, for the reason that the end which first receives it has but little motion, and the additional reason that the mass falling from the hopper at this point tends to keep it clogged or choked.

In my device the equal regular lateral vibration of both ends of the shoe, combined with the upward and downward motion when carried past the vibrating center, tends to thoroughly agitate and shake the mass, so that it flows regularly from the moment it touches the screens till it escapes.

In the ordinary device, where any longitudinal action is produced, the mass is carried over the discharge end of the screens irregularly by the inward vibrations. At the same time that I accomplish this effect of distributing and feeding the mass regularly by my device, I always keep the screens level at whatever positions the vibrations may carry them, so that there will be no inclination to either one side or the other.

The shoe D and screen G are actuated by means of a vertical shaft, K, Figs. 1 and 6, and dotted lines, Fig. 2, to which are rigidly secured three angle-irons, *k k k*, one at the middle and the others at the top and bottom, respectively, each having a suitable number of adjusting holes *u u*, into any of which, in the middle angle-iron, fits the end of a connecting-rod, L, the opposite end being suitably jointed with a crank, *l*, on the end of the fan-shaft; and into those of the extreme angle-irons fits the ends of couplings *v v*, jointed at the opposite ends to the shoes D and G, as represented most clearly in Fig. 6. The advantage of this arrangement is that I can actuate both shoes D G by means of the single shaft K, and can give both shoes the same and equal amount of action, or by shifting either coupling nearer to or farther from the shaft I can give one a greater and the other a less amount of action, and vice versa. This difference in the action of the screens is frequently necessary.

From the upper screens the grain falls on an inclined chute, M, having a ledge, *m*, at its bottom to stop the grain and an opening or slot, *n*, for it to pass through. Thence it falls on another chute, N, below, turning on an axis, *o*, at the lower end, but adjustable higher or lower at the upper end by means of a bolt, P, Figs. 3, 4, and 7, sliding in a box, *w*, and pressed forward by a spring, *z*, into any one of a series of sockets, *q q q*, in the frame-work, so as to hold. As the grain falls on the chute N the light impurities will be carried higher up by the blast and finally discharged. The chute is provided with check-pieces *r r* at each end of such position as to contract the blast, thereby making it equal in power upon all portions of the chute, which is a useful effect.

By means of the adjusting-bolt *p* and sockets *q q*, or their equivalent, the chute N may be set at any angle desired, as indicated by red lines, Fig. 4, so as to adapt it to any kind or condition of grain. Indeed, it may be made to close nearly or quite the whole space between N and M, as would be necessary in separating grass seed.

I do not claim suspending the shoe of a fanning-mill loosely, so that it may receive an irregular longitudinal as well as a lateral motion, nor do I claim a shoe or screen vibrating laterally; when the same acts only in a horizontal plane and has no swinging, oscillating, or vertical motion, as I am aware that such devices were known before my invention. But I am not aware that a shoe or screen was ever before used combining a lateral vibration with an oscillating movement like a pendulum, so as to produce vertical action when thrown beyond the center, and at the same time braced against any longitudinal movement. Therefore

What I claim as my invention, and desire to secure by Letters Patent, is—

1. Suspending or supporting the shoe D of a fanning-mill or its screens by means of the vibrating arms *d d* and rock-shaft E, or equivalent, in such a manner as to brace said shoe or screens against any longitudinal movement, but to allow a free and regular lateral motion, combined with a vertical one, produced by the oscillating or pendulous motion described, said shoe or screen and vibrating arms being combined with each other and with the fanning-mill, for the purpose herein set forth.

2. In combination with the shoe D, thus vibrated by the arms *d d* and with the similarly vibrating shoe or screen G, the shaft K, having the angle-irons *k k k*, provided with adjusting-holes *u u* and the couplings *v v*, the whole so arranged that an equal or an unequal action may be given to said screens and the same vibrated to a greater or less degree, substantially as herein specified.

In witness whereof I have hereunto set my hand this 28th day of October, A. D. 1863.

JOHN A. KRAKE.

Witnesses:
J. FRASER,
R. F. OSGOOD.